W. H. HUMFELD.
VEHICLE WHEEL.
APPLICATION FILED FEB. 6, 1911.
1,015,186.
Patented Jan. 16, 1912.
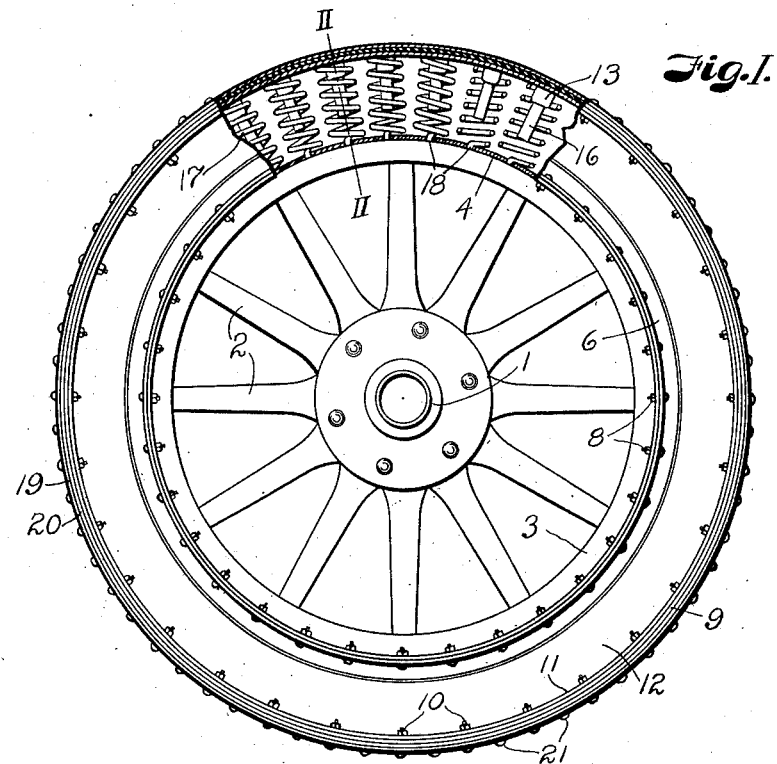
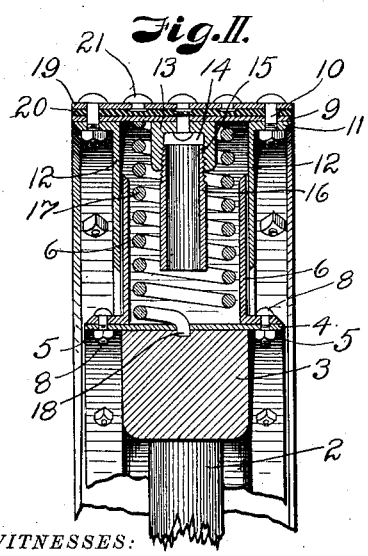
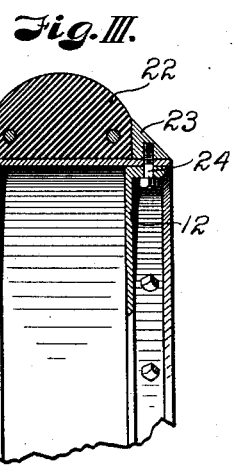
WITNESSES:
Arthur W. Caps.
Myrtle M. Jackson.
INVENTOR.
W<sup>m</sup> H. Humfeld.
BY
Arthur C. Brown
ATTORNEY.

UNITED STATES PATENT OFFICE.

WILLIAM H. HUMFELD, OF KANSAS CITY, MISSOURI.

VEHICLE-WHEEL.

1,015,186.   Specification of Letters Patent.   Patented Jan. 16, 1912.

Application filed February 6, 1911. Serial No. 606,740.

*To all whom it may concern:*

Be it known that I, WILLIAM H. HUMFELD, a citizen of the United States residing at Kansas City, in the county of Jackson and State of Missouri, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to vehicle wheels and has for its object to provide a device of that character having a resilient tread which may be used as a substitute for the ordinary pneumatic tire. In accomplishing this object I provide a wheel body of convenient construction and mount a rim portion thereon, so that the latter may have sliding action, and wherein said rim portion is connected with the wheel body by suitable springs which may yield under the weight of the vehicle with which the wheel is used.

In the accompanying drawings forming part of this specification, Figure I is a side view of a wheel constructed according to my invention, a part of the tread casing being removed to show the interior construction. Fig. II is a cross section of the rim parts on the line II—II, Fig. I. Fig. III is a cross sectional view of a modified form of tread which may be used with my improved construction.

Referring more in detail to the parts:—1 designates the hub, 2 the spokes, and 3 the felly of an ordinary vehicle wheel. Fixed on the felly 3 is a plate 4 having laterally projecting edge portions 5 which extend beyond the side edges of the felly.

6 designates guide plates which extend radially from the felly and are secured to the projecting edge portions 5 of plate 4, preferably by bolts 8, the guide plates 6 being spaced apart to provide a channel therebetween.

9 designates a rim plate which is of greater width than the felly or plate 4. Fixed to plate 9, preferably by bolts 10, which extend through the laterally turned flanges 11, are guide members 12, which extend inwardly past the inner guide plates 6, preferably on the outer sides thereof, and are adapted for sliding travel thereover. Fixed to the plate 9 at the center of the channel formed between the inturned guide members 12, at regular intervals around the periphery of the wheel, are cups 13 having inwardly facing sockets 14 provided with screw threads 15. Threaded into the sockets 14 are posts 16, preferably of tubular construction in order to lessen the weight of the device. Surrounding posts 16 and cups 13 are coil springs 17, the outer ends of which bear against the felly plate 4 and have downturned shanks 18 which project through apertures in plate 4 into sockets in the felly in order to anchor the springs and hold the loose tread against creeping movement on the wheel.

I prefer to use the tread shown in Figs. I and II of the drawings and consisting of the plate 9, previously mentioned, an outer metal plate 19, and an intermediate member 20 of rubber or like material; the three members being connected by the bolts 10 which bind the tread to the flanges of the inturned guide members 12. In order to obviate skidding, I provide this tread with studs 21 of any suitable construction and number.

The modified form of tread shown in Fig. III comprises the rim plate 9, a cushion tread 22, which is seated directly on the rim plate, and keeper rings 23, which are secured to the rim plate by lag bolts 24.

In using my improved device the parts are assembled as described by attaching plates 6 and 12 to the felly and rim members respectively, at one side of the wheel, installing the posts and springs, and inclosing the latter by attaching the plates 6 and 12 at the opposite side of the wheel. The wheel is then applied to a vehicle in the usual manner. When the vehicle is in motion, the wheel will revolve so that the tread which is spaced from the felly by the compression springs comes in rolling contact with the ground and the springs are compressed to provide a cushion for the weight carried thereby.

It is apparent that the posts 16 will hold the springs in proper position against the outer rim plate, and that the shanks 18 will prevent the springs and tread from creeping relative to the felly. It is also apparent that during the in and out travel of the wheel tread, the guide members 12 will move over the plates 6 and that the arrangement of such plates will prevent the displacement of the tread.

Having thus described my invention, what I claim as new therein and desire to secure by Letters-Patent is:—

1. In a vehicle wheel, a felly plate, plates extending radially from the felly plate and having flanges bolted thereto, said plates being spaced to form a channel, a tread plate, guide members extending inwardly from the tread plate and having flanges secured thereto, said last named plates being spaced to form a channel into which the projecting members on the felly plate are extended, cups fixed to the tread plate, posts threaded into said cups, and springs surrounding said posts and cups and bearing against the felly plate and tread plate, the inner ends of said springs being projected through the felly plates into the wheel felly, substantially as set forth.

2. In a vehicle wheel, the combination with the wheel felly, of a plate fixed to the felly and projecting from opposite sides thereof, plates projecting radially from the felly plate and having flanges projecting over the parts thereof on the outside of the felly, bolts securing said flanges to the projecting parts of the felly plate, a tread comprising metal rings separated by a ring of yielding material, guide members projecting inwardly from the tread member and having flanges securing same thereto by bolts which pass through the entire tread member, said guide members and the projecting members on the felly plate being adapted for frictional contact, cups fixed to the tread member and having inwardly facing sockets, posts threaded into said sockets, and coil springs surrounding the cups and posts and bearing against the tread member and felly plate, the inner ends of said springs being projected through the felly plate, substantially as and for the purpose set forth.

In testimony whereof I affix my signature in presence of two witnesses.

WILLIAM H. HUMFELD.

Witnesses:
  MYRTLE M. JACKSON,
  PEARLE LOCKE.

---

Copies of this patent may be obtained for five cents each, by addressing the "Commissioner of Patents, Washington, D. C."